(12) United States Patent
Neumeier et al.

(10) Patent No.: US 9,337,637 B2
(45) Date of Patent: May 10, 2016

(54) SLIDE FOR A MODULAR RAIL-MOUNTED DEVICE, MODULAR RAIL-MOUNTED DEVICE AND BUS BAR NETWORK

(71) Applicant: SIEMENS AKTIENGESELLSCHAFT, Munich (DE)

(72) Inventors: Michael Neumeier, Regensburg (DE); Tobias Sturm, Wiesent (DE); Christoph Weber, Ergoldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 83 days.

(21) Appl. No.: 14/016,421

(22) Filed: Sep. 3, 2013

(65) Prior Publication Data

US 2014/0063704 A1   Mar. 6, 2014

(30) Foreign Application Priority Data

Aug. 31, 2012   (DE) .......................... 10 2012 215 470
Jun. 26, 2013   (DE) .......................... 10 2013 212 335

(51) Int. Cl.
*H01R 9/26*   (2006.01)
*H02G 5/00*   (2006.01)
*H02B 1/052*   (2006.01)

(52) U.S. Cl.
CPC ............... *H02G 5/00* (2013.01); *H02B 1/0526* (2013.01); *Y10T 403/599* (2015.01)

(58) Field of Classification Search
CPC .......................................................... H01R 9/26
USPC .......................................................... 439/716
See application file for complete search history.

(56) References Cited

U.S. PATENT DOCUMENTS 5,775,955 A * 7/1998 Graube et al. ................. 439/717

FOREIGN PATENT DOCUMENTS

| DE | 19912125 A1 | 9/2000 |
| DE | 10340209 A1 | 4/2005 |
| DE | 102006057321 A1 | 6/2008 |
| DE | 102010052956 A1 | 11/2011 |
| DE | 102011101078 A1 | 11/2011 |
| DE | 102011082953 A1 | 3/2013 |
| EP | 0874433 A2 | 10/1998 |
| EP | 146720 A1 | 9/2004 |
| EP | 2259396 A2 | 12/2010 |

* cited by examiner

*Primary Examiner* — Phuong Dinh
(74) *Attorney, Agent, or Firm* — Laurence Greenberg; Werner Stemer; Ralph Locher

(57) ABSTRACT

A slide for a modular rail-mounted device where the rail mounted device is embodied for use in a bus bar network. The slide is used for locking the rail-mounted device on an attachment rail, wherein the slide has an attachment device for captive attachment of the slide to the rail-mounted device.

17 Claims, 9 Drawing Sheets

SLIDE FOR A MODULAR RAIL-MOUNTED DEVICE, MODULAR RAIL-MOUNTED DEVICE AND BUS BAR NETWORK

CROSS-REFERENCE TO RELATED APPLICATION

This application claims the priority, under 35 U.S.C. §119, of German applications DE 10 2012 215 470.1, filed Aug. 31, 2012 and DE 10 2013 212 335.3, filed Jun. 26, 2013; the prior applications are herewith incorporated by reference in their entireties.

BACKGROUND OF THE INVENTION

Field of the Invention

The present invention relates to a slide for a modular rail-mounted device which is embodied for use in a bus bar network, wherein the slide, on reaching a locking position relative to the rail-mounted device, is used for locking the rail-mounted device in the bus bar network, especially on a top-hat rail. The invention further relates to a modular rail-mounted device for use in a bus bar network, having a functional connection for connection of a lead, a cover of the functional connection with an opening for the passage of the lead and a slide for locking the rail-mounted device in the bus bar network, especially to a top-hat rail. Furthermore the invention relates to a bus bar network having at least two modular rail-mounted devices.

Modular rail-mounted devices for bus bar networks are known. They are used for example in the form of circuit breakers or power breakers in switching cabinets, in order to connect lines to one another. Modular rail-mounted devices can also be used in switching cabinets for protection mechanisms, such as with breaker switches for example. In known modular rail-mounted devices of this type it is usual for the devices to be attached to an attachment rail, for example in the form of a top-hat rail. For this purpose such a modular rail-mounted device has a locking mechanism. In particular this possesses a slide which is able to be moved towards and away from the modular rail-mounted device between a locking and an unlocking position in relation to the top-hat rail. With known rail-mounted devices the slide is moved by the slide being brought with the aid of a tool, for example a screwdriver, into the desired release position in order to release the rail-mounted device from the attachment rail. In addition known rail-mounted devices have covers which cover a functional connection of the rail-mounted device. Such a functional connection is to be understood as a facility for connecting a lead. Such covers are in particular provided with openings to enable a lead to pass through the cover to the functional connection. The functional connection thus serves to clamp or attach a lead to the rail-mounted device.

One objective with modular rail-mounted devices is that the devices are able to be released from the bus bar network in order to increase the customer benefits of the rail-mounted devices. If a rail mounted device is to be exchanged in the network, not every rail-mounted device thus has to be unscrewed and the bus bar removed, but only the desired rail-mounted device should be released from the top-hat rail. For dismantling, the slide should be able to be unlocked from the front side of the rail-mounted device without using any tools. With high-quality circuit breaker switches with 125 A rated current the customer should also have the possibility of automatically changing between clamp and ring cable shoe technology. This means that the customer either uses the terminal installed in the as-delivered state to attach leads, or removes the complete terminal system, i.e. the functional connection, and screws leads which are provided with a ring cable shoe to the terminal. To this end the cover of the terminal must be able to be dismantled for the customer.

Published, non-prosecuted German patent application DE 10 2011 082 953 A1 discloses a modular rail-mounted device for use in a bus bar network. The rail-mounted device is attached by a slide to the bus bar network, especially to an attachment rail. The slide is coupled to a cover for the functional connection, so that the cover can be used for displacing the slide. However the disadvantage with the rail-mounted device is recognizing when the slide has assumed the locking position. It is especially disadvantageous that the slide can fall out of the rail-mounted device in the unlocking position. The steel spring which is provided within the slide, pushes the slide out of the rail-mounted device. The user, especially an installer, constantly has to push the cover coupled to the slide onto the rail-mounted device so that the slide does not slip out of the rail-mounted device. This means that the installer does not have both hands free, in order for example to change the functional connection of the rail-mounted device.

SUMMARY OF THE INVENTION

The object of the present invention is to eliminate, at least in part, the above-mentioned disadvantages of known rail-mounted devices. In particular the object of the present invention is to make available a slide, a modular rail-mounted device and a bus bar network which make possible a simple and low-cost solution to enable the rail-mounted device to be exchanged and/or the functional connection to be exchanged, without the slide impeding the process.

This above object is achieved by a slide for a modular rail-mounted device, a modular rail-mounted device and by a bus bar network. Further features and details of the invention emerge from the subclaims, the description and the drawings. Features and details described in the context of the inventive slide of course also naturally apply here in the context of the inventive rail-mounted device and the inventive bus bar network and vice versa in each case, so that reference is or can always be made reciprocally to the individual aspects of the invention in respect of the disclosure.

The object is achieved by a slide for a modular rail-mounted device which is embodied for use in a bus bar network, wherein the slide is used for locking the rail-mounted device on an attachment rail, especially a top-hat rail. The slide is characterized in that it has an attachment device for captive attachment of the slide to the rail-mounted device. This ensures that the installer can easily see that the slide has reached the captive position relative to the rail-mounted device. This means that it can be ensured by the attachment device that the slide, after reaching a specific position, in which the attachment device engages into a corresponding complementarily embodied mating attachment device in the housing of the rail-mounted device, can no longer be released from the rail-mounted device. The slide can actually be moved relative to the rail-mounted device, so that the slide can be attached to an attachment rail or can be released from the rail again. The attachment device however, in conjunction with the mating attachment device in the housing of the rail-mounted device, ensures that the slide cannot be completely released from the rail-mounted device. The attachment device serves to hold the slide captive in the rail-mounted device after it has been installed on the rail-mounted device.

It is especially advantageous that the slide, after being released from the attachment rail, is held captive on the rail-mounted device. The attachment device of the slide, in conjunction with at least one mating attachment device of the rail-mounted device, makes it possible for the slide to be held not only in a locked position but also in the unlocked position captive on the rail-mounted device, especially on the housing of the rail-mounted device. If the rail-mounted device is released from the attachment rail, the attachment device ensures that this enters into a force-fit and/or form-fit connection to a mating attachment device of the rail-mounted device and through this holds the slide on the rail-mounted device, so that this cannot slip out of the slide-in module of the rail-mounted device. An installer can release the slide from the attachment rail, for example a top-hat rail, of the bus bar network, remove the rail-mounted device from the bus bar network and release the cover of the rail-mounted device for exchanging a functional connection, without the slide being lost. The latter is held on the rail-mounted device in the unlocked position by the attachment device.

The unlocked position in the sense of the invention is a position of the slide relative to the rail-mounted device which is different from the locked position. In the locked position the slide is in contact with an attachment rail. In the unlocked position the slide is moved in the direction of the cover of the rail-mounted device and at a distance from the locked position. The unlocked position is preferably dimensioned so that the slide continues to be guided in a slide-in module of the rail-mounted device, i.e. at least a part of the slide continues to be held in or on the rail-mounted device.

A slide embodied in this way makes possible simple installation of the slide on the rail-mounted device. In particular such a slide can easily be used in production even with a riveted rail-mounted device. The slide in this case is pushed into a corresponding slide-in module or a corresponding guide, until the attachment device engages with the at least one mating attachment device and the installer knows that after the engagement of the attachment device on the at least one mating attachment device the slide is held captive on the rail-mounted device. Because of the captive retention of the slide on the rail-mounted device, an installer can easily exchange a functional connection of the rail-mounted device, for example from a clamped terminal to a ring cable shoe terminal. The slide makes it possible to move the slide from the front, i.e. from the cover side, without tools. Especially advantageously the slide has a slide actuator. This means that the slide actuator can be part of the slide. This can be realized by a force-fit connection, for example via a latching connection between the slide and the slide actuator. The slide can be actuated without tools especially via the slide actuator which is preferably the cover of the functional connection. The slide actuator can especially be embodied in one piece, for example monolithically with the slide. This is especially preferred if the slide actuator is disposed on the slide via an articulated joint, such as a film hinge.

The slide can be attached to the rail-mounted device, especially to the housing of the rail-mounted device in different ways by the attachment device. The attachment device can be embodied for force-fit and/or form-fit attachment of the slide to at least one corresponding mating attachment device of the rail-mounted device. For example the slide can be held on the rail-mounted device by a clamp projection on the slide. I. e. the attachment device can be embodied and dimensioned such that this makes a clamp connection with corresponding mating attachment devices of the rail-mounted device in each case.

An inventive slider is characterized in that the attachment device has at least one latching element, especially at least one latching projection. The at least one mating attachment device of the rail-mounted device is embodied accordingly as a latching receptacle, into which the latching element, especially latching projection, can latch. When it reaches the captive position, the latching element latches onto a mating attachment device, especially a latching receptacle, of the rail-mounted device. The installer knows from the latching of the latching element into the corresponding latching receptacle that the captive position is reached.

In the captive position the slide can be moved relative to the rail-mounted device, so that the slide can be locked onto an attachment rail or can be moved from the locked position on the attachment rail into an unlocked position. The attachment of the slide in the locked position on an attachment rail is releasable, so that the slide can be transferred into the unlocked position.

It is conceivable for a latching element to be disposed for example in a central position on the slide. This can be on the upper side or the lower side for example. In accordance with a preferred development of the invention there can be provision with a slide, for a latching element to be disposed on each side of the slide. An especially secure latching on the housing of the rail-mounted device, especially an insert in the housing of the rail-mounted device is guaranteed by this. The latching elements are preferably embodied directly opposite one another on the slide. A slide embodied in this way makes it possible in a simple and low-cost manner for an installer to establish whether the slide has assumed the captive position on the rail-mounted device. The latching gives them tactile and possibly also an acoustic feedback and they know from this that the rail-mounted device is held captive on the rail-mounted device. Through the fixing of the slide on the rail-mounted device in the captive position, the user of the rail-mounted device can easily change the functional connection of the rail-mounted device without constantly having to worry about the slide falling out of the rail-mounted device. The slide can be coupled to the cover of the rail-mounted device, so that the cover simultaneously serves as an actuator for locking or unlocking the slide.

An inventive slide is characterized in that the slide has a slide spring which is embodied in one piece, especially monolithically with the slide, and that the slide has a frame and a cover section, on which a cover of the rail-mounted device is able to be disposed, which are able to be moved relative to one another against the spring force of the slide spring. This spring force can for example be created by the embodiment of the slide itself. For example individual areas of the slide can be embodied as spring elements, as can be provided by the elastically-sprung resetting forces of individual plastic materials as components of the slide. It can however also be advantageous for a separate slide spring, for example in the form of a steel spring, to be provided in order to create the desired spring force. This embodiment has the advantage of a latching, i.e. a locking of the rail-mounted device on an attachment rail being able to be undertaken without the cover being moved between the first and the second position. This can also be understood as a type of snap-fit latch connection. Thus the rail-mounted device can be placed on the attachment rail without the cover having to be varied. In this embodiment the cover is only moved when the rail-mounted device is taken off the attachment rail. This makes a rail-mounted device even easier to use and in addition makes possible the same functionality as is already known to an installer, when known rail-mounted devices are used.

Furthermore, with an inventive slide there can be provision for the cover section to have latching devices and for the frame to have latching receptacles, so that the cover section can be latched by the latching devices onto the latching receptacles of the frame against the spring force of the slide spring. This means that the slide spring is disposed between the frame and the cover section. This enables the cover section to be moved relative to the locking section.

In accordance with a second aspect of the invention, the object is achieved by a modular rail-mounted device for use in a bus bar network, having a functional connection for connection of a lead, a cover of the functional connection with an opening for the passage of the lead and a slide for locking the rail-mounted device onto an attachment rail, especially onto a top-hat rail. The modular rail-mounted device is characterized in that the slider is embodied in accordance with the first aspect of the invention and that the rail-mounted device has at least one mating attachment device for attaching the slide to the rail-mounted device in the captive position.

The rail-mounted device has at least one mating attachment device. This serves, in conjunction with the attachment device of the slide, to latch the slide captively on the rail-mounted device. The mating latching device of the rail-mounted device and the latching device of the slide ensure that the slide does not fall out of the rail-mounted device, but is held firmly on the rail-mounted device when the captive position is reached. This means that the slide, even after the release of the rail-mounted device from an attachment rail, sits firmly on the rail-mounted device, whereby other changes to the rail-mounted device, such as for example connection technology for connecting the lead, can be easily undertaken.

The mating attachment device is preferably embodied in a complementary manner to the attachment device.

An inventive rail-mounted device can be developed such that the mating attachment device is embodied as a latching receptacle, especially as a recess, in a housing part of the rail-mounted device. In an alternate rail-mounted device there can be provision for the attachment device of the slide to be embodied as a latching receptacle, for example as a recess, and for the mating attachment device to be embodied as a latching element, for example as a latching projection.

It is especially advantageous if, in an inventive rail-mounted device, the slide and the cover are connected releasably to one another. In other words a two-part embodiment of the slide and the cover is involved, so that the connection is especially embodied reversibly-releasable. This leads to the cover, especially with a rail-mounted device removed from the bus bar network, being embodied so that it can be removed from the rail-mounted device. The slide remains on the rail-mounted device. The fact that the cover can be removed guarantees that the functional connection is ideally accessible on the exposed rail-mounted device. The removed cover enables the functional connection to be embodied exchangeably in this way, so that users of an inventive rail-mounted device have a free choice of the type of functional connection that they wish to use for this rail-mounted device. If the cover is removed the functional connection can be exchanged. It is also possible to exchange the cover itself in this way. Thus not only the functional connection can be exchanged but in addition the cover can also be adapted to the type of functional connection. In this way a plurality of different covers can be used with one and the same rail-mounted device, which are adapted to the corresponding type of functional connection. In such cases the functional connections especially involve a screw connection and/or a ring cable shoe connection. The cover preferably represents the slide actuator. Preferably the cover or slide actuator can be part of the slide. The cover or slide actuation allows the slide to be actuated without tools.

In accordance with an advantageous development of the invention, there can be provision with a rail-mounted device for the slide and the cover to be connected to each other via a flexible slide strap. Latching positions allow the customer to detect in which position the slide is located relative to the rail-mounted device or to the attachment rails. The flexibility of the slide strap is utilized for the latching position.

Another advantageous development of the rail-mounted device makes provision for the slide and the cover to be embodied in one piece, especially monolithically. For example a cover and a slide can be manufactured in one-piece from a plastic material, by an injection molding process. Even with multi-part, especially two-part embodiments and subsequent connection, plastic materials can be used for the slide and the covers. The use of plastic has the advantage that on the one hand this material reduces the costs of manufacturing and on the other hand has electrically-isolating properties.

An inventive rail-mounted device can be developed such that the rail-mounted device has viewing windows onto the mating attachment devices. This enables the user, especially an installer, to visually detect whether the slide has assumed the captive position.

Furthermore there can be provision with an inventive rail-mounted device for the functional connection to be disposed exchangeably behind the cover.

In this way the user of an inventive rail-mounted device can freely decide which type of functional connection they prefer. The exchangeability is especially provided before the first installation, so that before the installation of the rail-mounted device in a switching cabinet, especially thus on the bus bar network, the functional connection is exchanged or selected respectively. In such cases it is possible for the functional connection to be a clamp terminal or a ring cable shoe terminal. These two variants are the most frequent possible applications for the functional connection. A clamp terminal is to be understood as clamping an end of a lead from which insulation has been removed. Clamping jaws are necessary for this purpose, which are held in the desired position via an adjustment device, for example an adjustment screw or a clamping screw. In this way the lead is connected mechanically to the functional connection of the rail-mounted device and thus facilitates an electrical connection. A ring cable shoe connection is significantly wider in respect of its geometrical dimensions, but can be advantageous when used in a number of situations. The exchangeability of the functional connection enables a free choice to be made as to whether a clamp terminal or a ring cable shoe terminal is to be used as the functional connection.

It can likewise be advantageous if, in an inventive rail-mounted device, the opening is disposed in the cover such that a lead routed through the opening prevents the cover being moved from the first position into the second position. The cover is thus secured in the first position by the lead so to speak. In this way the rail-mounted device is prevented from being removed when the lead is still in the opening and thus in the connected state on the functional connection. With rail-mounted devices it can be disadvantageous for these to be removed while they are still connected to the bus bar network. An inventive embodiment ensures that the rail-mounted device can only be removed if the lead is also unclamped. A mechanical safety device is thus involved, wherein the lead as a functional device simultaneously assumes the safety function on the rail-mounted device. This is especially able to be set when taking account of the two positions of the cover, by a blocking of the movement in the direction of the second position being obtained if the lead projects through the opening.

A further advantage can be if, with an inventive rail-mounted device, the slide and/or the cover have at least one film hinge, via which the movement of the cover between the first and the second position is or can be diverted into another direction. Usually with a rail-mounted device the lock can be moved into a first plane, while the movement of the cover preferably takes place in a second plane. These two planes are frequently at an angle, for example at right angles, to one another. The provision of a film hinge is one possibility for diverting the tensile force which is transmitted to the hinge by the movement of the cover. This transmission option is embodied especially simply and at low cost in respect of the manner of construction. In addition an adaptation to given geometries of known modules for bus bar networks can be provided in this way, so that an inventive modular rail-mounted device is also able to be used with existing bus bar networks. A combination of known rail-mounted devices and inventive rail-mounted devices is possible in this way in an especially simple manner and in particular without additional outlay.

It can be of advantage, if with an inventive rail-mounted device, at least one connection device is embodied on the slide at least in sections essentially semi-cylindrically and at least one connection receptacle on the cover has a cylindrical recess. The cylindrical recess of the connection receptacle preferably has a breakthrough in the side wall through which the connection device can be taken out of the connection receptacle. The breakthrough corresponds with the semi-cylindrical embodiment of the slide. In this case this half cylinder is aligned such that it only passes through the breakthrough relative to the slide in the third position of the cover. If the cover is further rotated around the axis of the slide, the relation between the contour of the half-cylinder and the breakthrough shifts such that removal through the breakthrough is no longer possible. Instead the mechanical connection between the cover and the slide is established in a force-fit manner in this way. During the movement between the first and the second position the breakthrough thus does not have any function and force is transmitted via the cylindrical recess of the connection receptacle and the half-cylindrical outer surfaces of the connection device. This represents an especially simple constructive solution, which is especially able to be established at low cost and simultaneously makes possible a high functionality in respect of two or respectively three positions of the cover.

A further object of the present invention is a bus bar network with at least two inventive modular rail-mounted devices and an attachment rail, especially in the form of a top-hat rail. The rail-mounted devices are able to be locked via the respective slide of the rail-mounted devices into this attachment rail or onto this attachment rail. The use of at least two inventive modular rail-mounted devices brings with it the same advantages as those already discussed at length in relation to an inventive rail-mounted device.

Other features which are considered as characteristic for the invention are set forth in the appended claims.

Although the invention is illustrated and described herein as embodied in slide for a modular rail-mounted device, a modular rail-mounted device and a bus bar network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
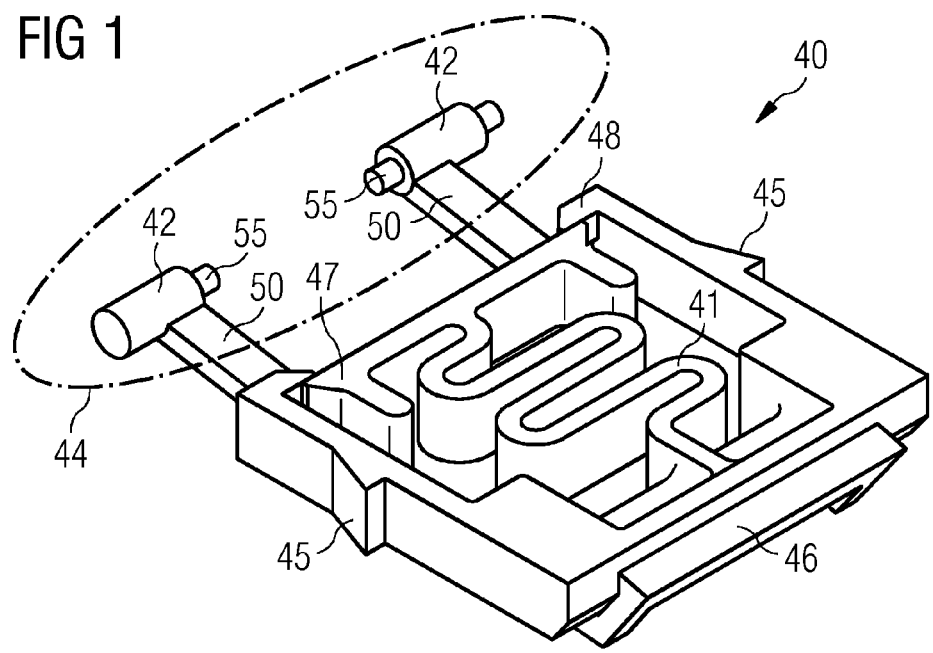
FIG. 1 is a perspective view of a slide according to the invention.

Elements with the same function and effect are each provided with the same reference characters in FIG. 1 to FIG. 12.

Figure 2:
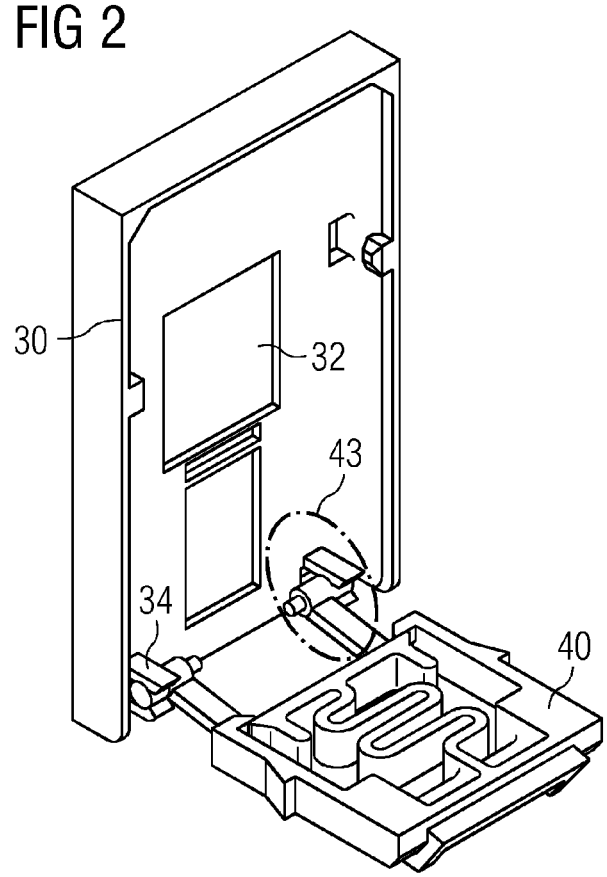
FIG. 2 is a perspective view of an embodiment of a cover and the slide.
Figure 3:
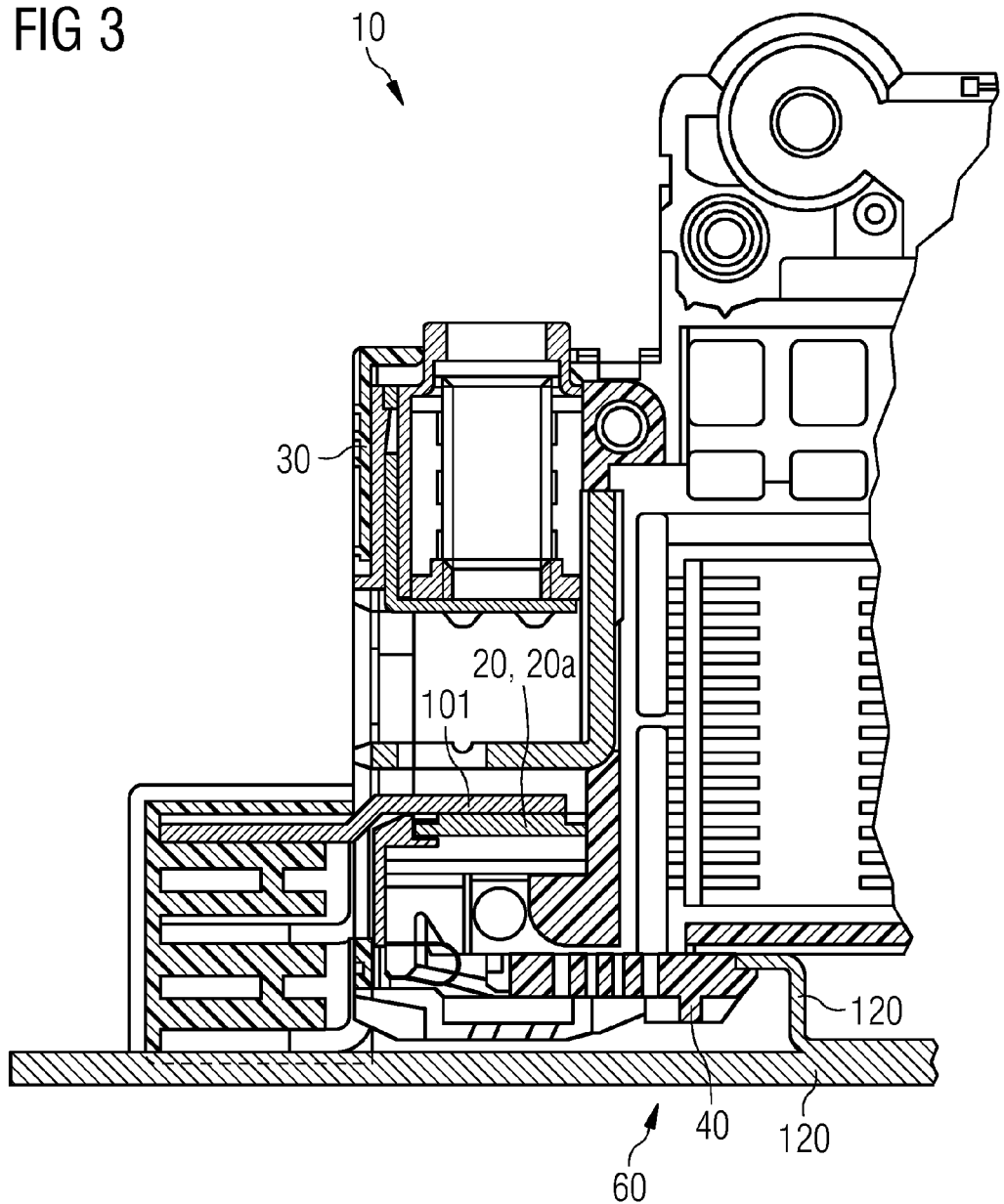
FIG. 3 is a sectional view of an embodiment of a rail-mounted device with the slide in a locked position.

Referring now to the figures of the drawings in detail and first, particularly to FIGS. 1-3 thereof, there is shown a perspective view of an inventive slide 40. The slide 40 has a cover section 44 to which a cover 30 of a rail-mounted device 10 can be coupled and a frame which serves to lock the slide 40 onto an attachment rail 120. The cover section 44 preferably has latching devices 47, flexible slide straps 50, connection devices 42 and latching contours 55 on the connection devices 42. The slide spring 41 is provided inside the slide 40. The slide spring 41 can be part of the cover section 44. The slide spring 41 makes possible a relative displacement of the frame, which is preferably formed from a locking section 46, attachment devices 45 and latching receptacles 48, to the cover section 44 of the slide 40. This enables the rail-mounted device 10 to be inserted on an attachment rail 120, without the cover 30 of the rail-mounted device 10 having to be moved. The slide 40 has the connection devices 42 and the latching contours 55, via which the slide 40 can be coupled to the cover 30, see FIG. 2.

Figure 5:
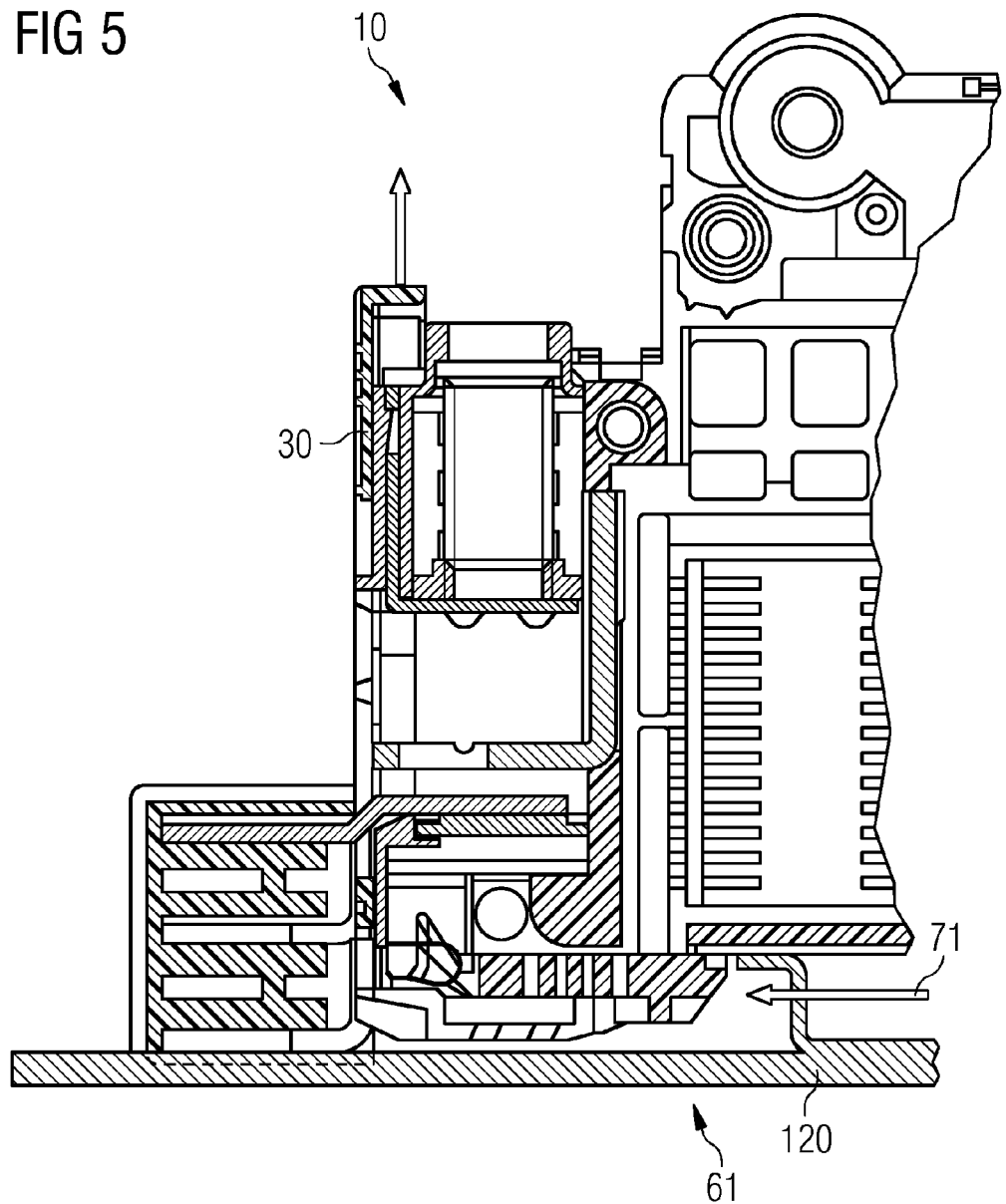
FIG. 5 is a sectional view of an embodiment of the rail-mounted device in accordance with FIG. 3 during a release of the slide from a bus bar network.
Figure 6:
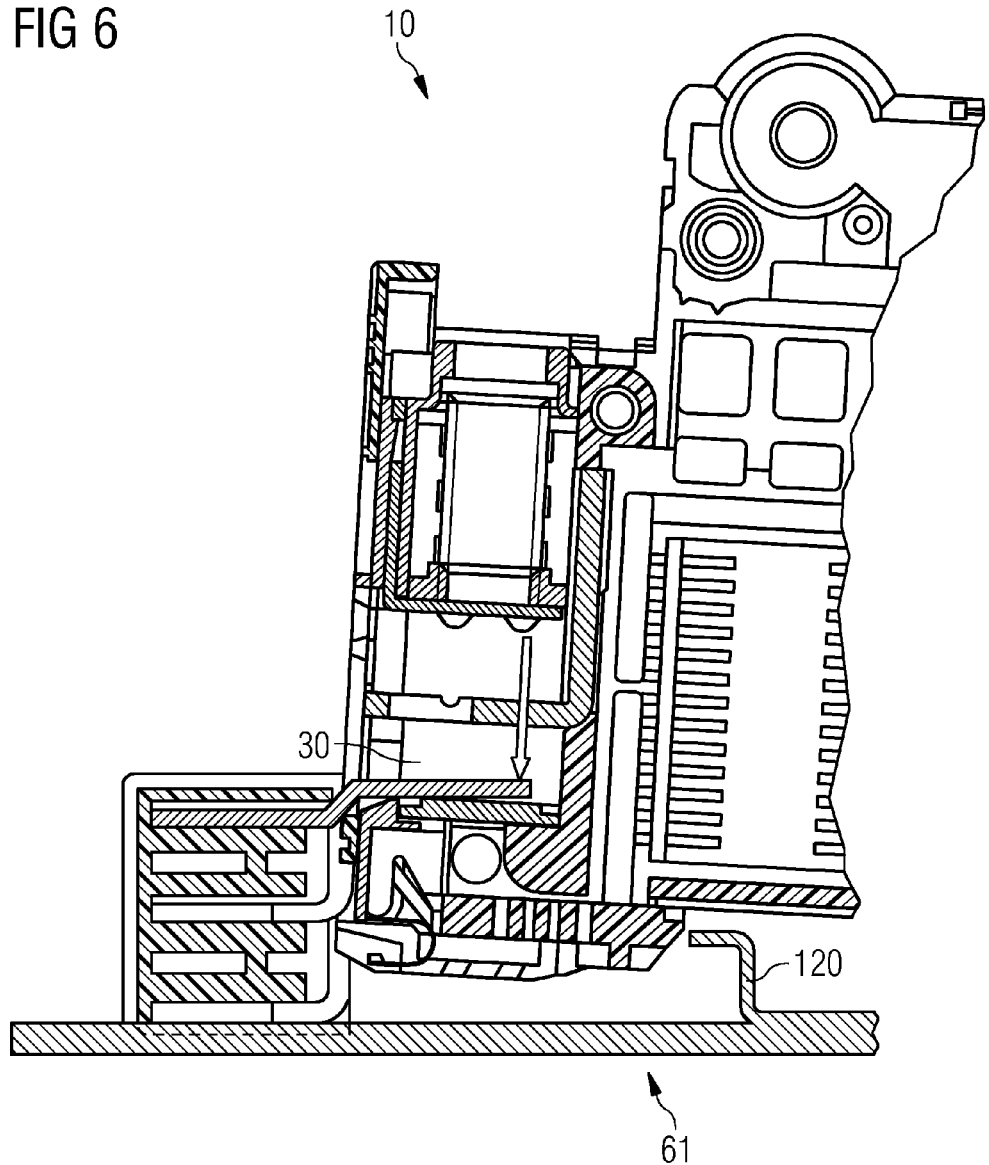
FIG. 6 is a sectional view of an embodiment of the rail-mounted device in accordance with FIG. 3 during the release of the rail-mounted device from the bus bar network.

On the side of the slide 40, the slide 40 has the attachment devices 45 in the form of latching elements for captive attachment of the slide 40 to the rail-mounted device 10 in an unlocked position 61 (see FIGS. 5-6). This means that, after installation on the rail-mounted device 10, the slide 40 is attached to the rail-mounted device 10 by the latching elements 45 in a captive manner. The attachment device 45 of the slide 40 make this possible in conjunction with at least one mating attachment device 22 of the rail-mounted device 10. If the rail-mounted device 10 is released from the attachment rail 120, the latching elements 45 guarantee that the slide 40 does not get lost, but continues to remain connected to the rail-mounted device 10. The attachment device 45 of the slide 40 makes a force-fit and/or form-fit connection with the mating attachment device 22 of the rail-mounted device 10. The slide 40 cannot then slip out of the rail-mounted device 10, especially a slide-in module of the rail-mounted device 10. It is advantageous, in the slide 40 embodied in such a way, for an installer to be able to release the slide 40 from the attachment rail 120, for example a top-hat rail, of the bus bar network, remove the rail-mounted device 10 from the bus bar network and release the cover 30 of the rail-mounted device 10 from the rail-mounted device 10 for exchanging a functional connection 20, without the slide 40 getting lost.

The slide 40 with the cover 30 is shown in FIG. 2. The cover 30 covers a functional connection 20 of the rail-mounted device 10. The cover 30 has an opening 32, to enable a lead to be routed through the cover 30 to the functional connection 20 of the rail-mounted device 10. The functional connection 20 is used to clamp or to attach a lead to the rail-mounted device 10. The cover-slide connection 43 is shown in FIG. 2.

FIG. 3 shows a schematic diagram of an embodiment of the rail-mounted device 10 with the slide 40 in the locked position 60. The locked position 60 means that the rail-mounted device 10, especially the locking section 46 of the rail-mounted device 10, is locked onto the attachment rail 120 and thereby holds the rail-mounted device 10 on the attachment rail 120. A terminal connection 20a is disposed in the rail-mounted device 10 as the functional connection 20.

Figure 4:
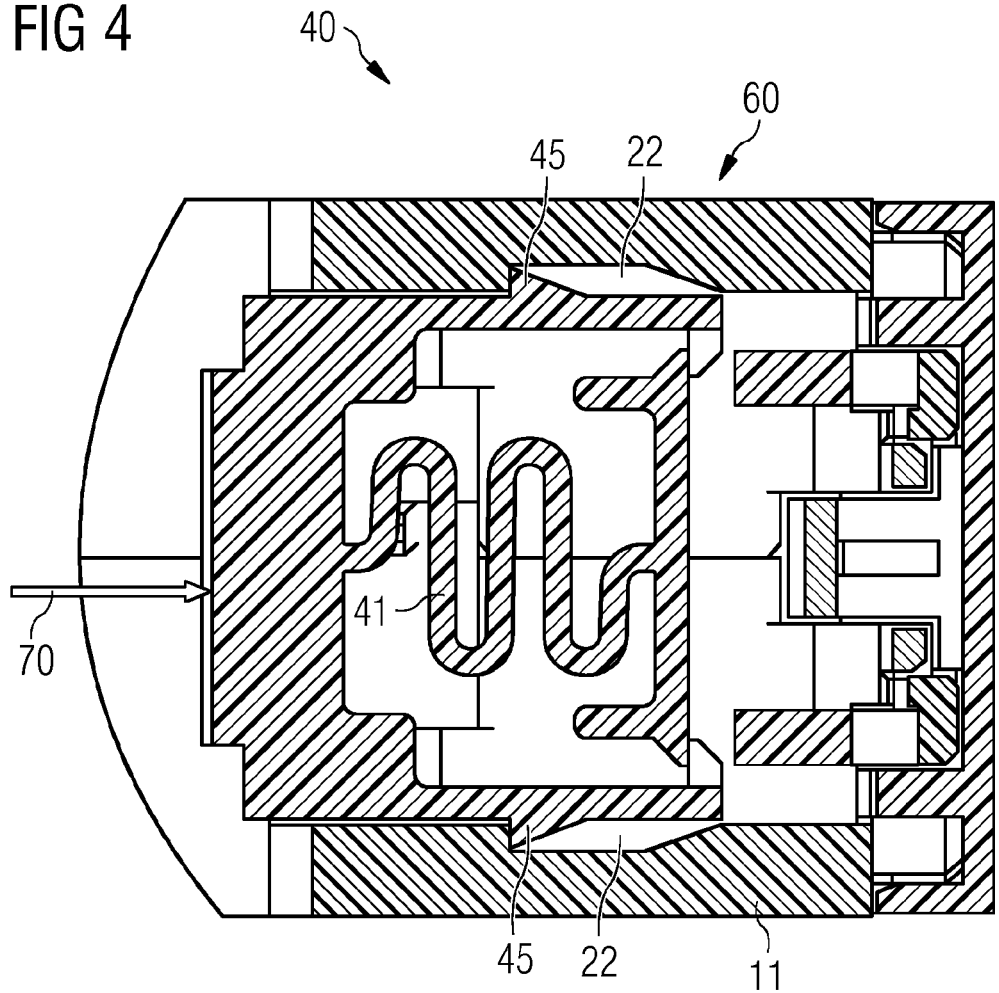
FIG. 4 is a sectional view from above of the slide in the unlocked position.

FIG. 4 shows a view from above of the inventive slide 40 in the locked position 60 relative to the rail-mounted device 10. The slide 40 has a latching element as the attachment device 45 on both of its long sides. The latching elements 45 are latched into corresponding first mating latching devices 22 of the rail-mounted device 10, especially of a housing 11 of the rail-mounted device 10. This ensures that the slide 40 cannot be removed against an installation direction 70 of the slide 40 from the rail-mounted device 10. In conjunction with the first mating latching devices 22 of the rail-mounted device 10, the latching elements 45 hold the slide 40 in a captive position. The latching elements 45 are formed by sloping projections.

FIG. 5 shows a schematic of the rail-mounted device 10 according to FIG. 3 during the release of the slide 40 from the attachment rail 120 of the bus bar network. FIG. 6 shows a schematic of the rail-mounted device 10 according to FIG. 3 during the release of the rail-mounted device 10 from the bus bar network. The slide 40 in FIG. 5 is pushed in a dismantling direction 71 or pulled by the cover 30 in the dismantling direction 71 and is herewith unlocked from the attachment rail 120.

Figure 7:
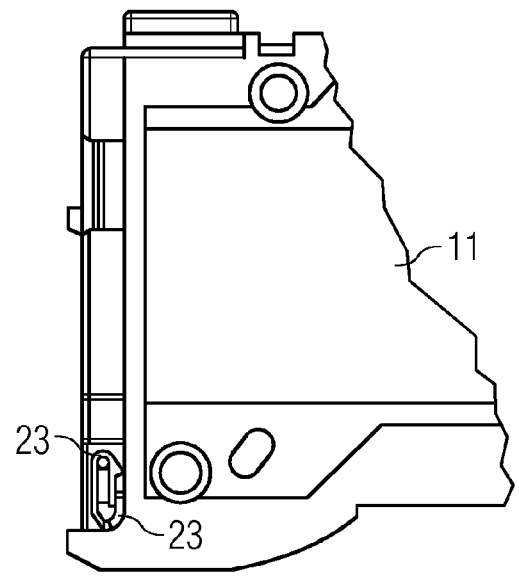
FIG. 7 is a front view showing latching positions of the slide on the rail-mounted device.
Figure 8:
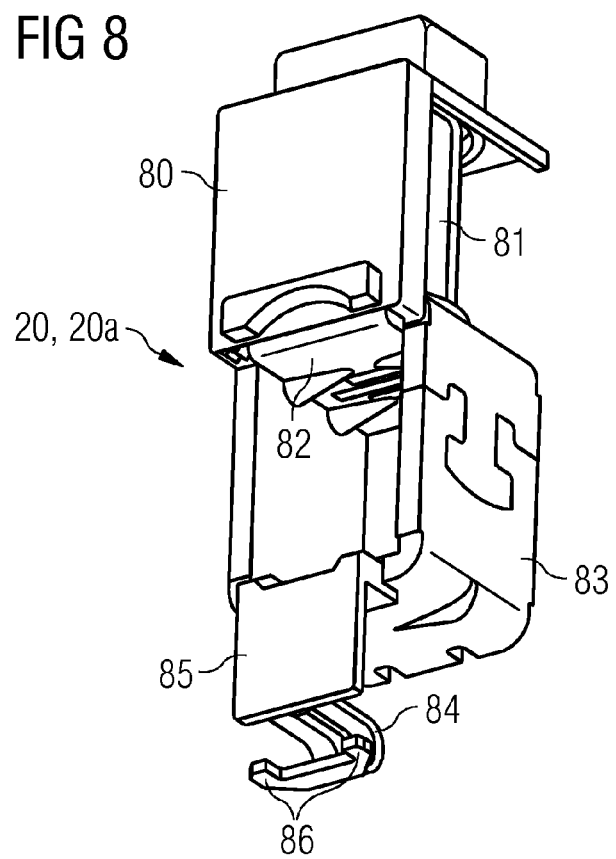
FIG. 8 is a perspective view of a dual-chamber terminal.

FIG. 7 shows latching positions 23 of the slide 40 on the rail-mounted device 10. The latching positions 23 serve to let the customer/installer know, during operation of the slide, whether it is locked or unlocked. In the locked position 60 the rail-mounted device 10 cannot be released from the top-hat rail 120, in the unlocked position 61 the rail-mounted device 10 is released from the top-hat rail 120. FIG. 8 shows a schematic in a perspective view of a dual-chamber terminal 20a. The dual-chamber terminal 20a has a protective guard 80, a clamping screw 81, a pressure piece 82, a clamping frame 83, a positioning spring 84, protection against incorrect insertion 85 and also contours 86 to prevent the dual-chamber terminal 20a from being incorrectly installed on the rail-mounted device 10.

Figure 9:
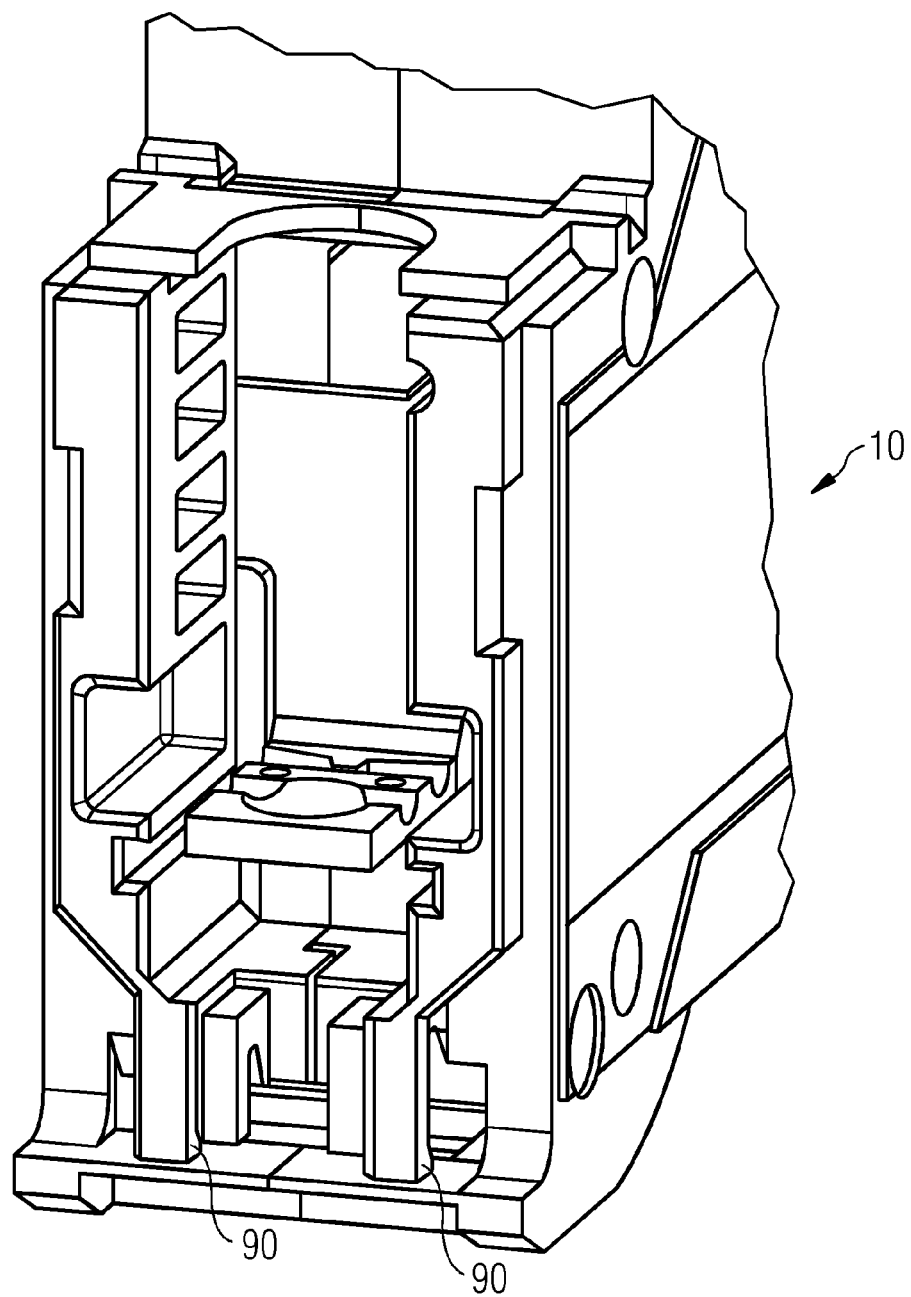
FIG. 9 is a perspective view of the rail-mounted device without a functional connection.
Figure 10:
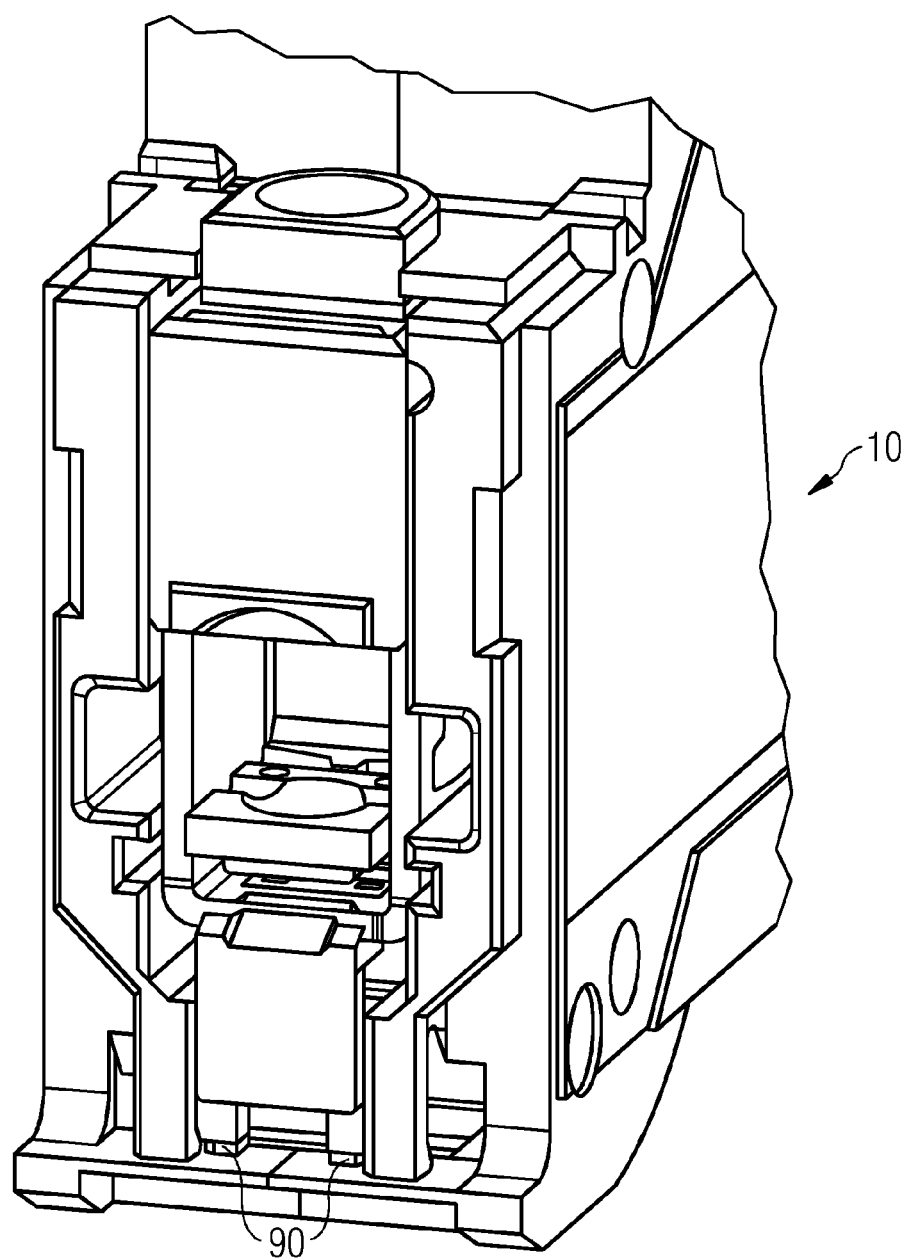
FIG. 10 is a perspective view of the rail-mounted device with the functional connection.

FIG. 9 shows a schematic in a perspective view of the rail-mounted device 10 without the functional connection 20, while FIG. 10 shows a schematic in a perspective view of the rail-mounted device 10 with the functional connection 20. FIG. 9 shows receptacles 90 on the rail-mounted device 10 for contours 86 for protection against incorrect insertion 85. In FIG. 10 the protection against incorrect insertion 85 of the dual-chamber terminal 20a sits in the housing 11 of the rail-mounted device 10 and through this positions the dual-chamber terminal 20a on the rail-mounted device 10.

Figure 11:
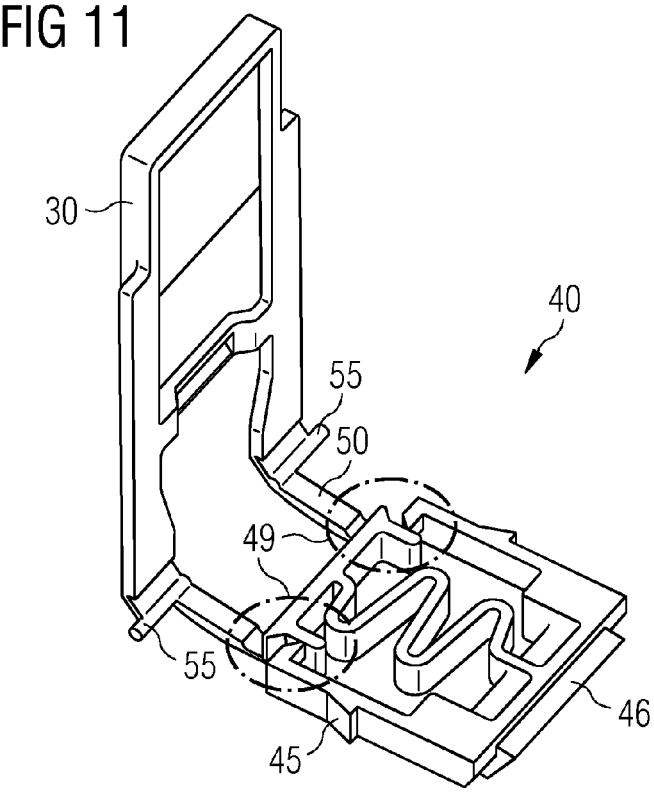
FIG. 11 is a perspective view of the slide with the cover with a relaxed slide spring.
Figure 12:
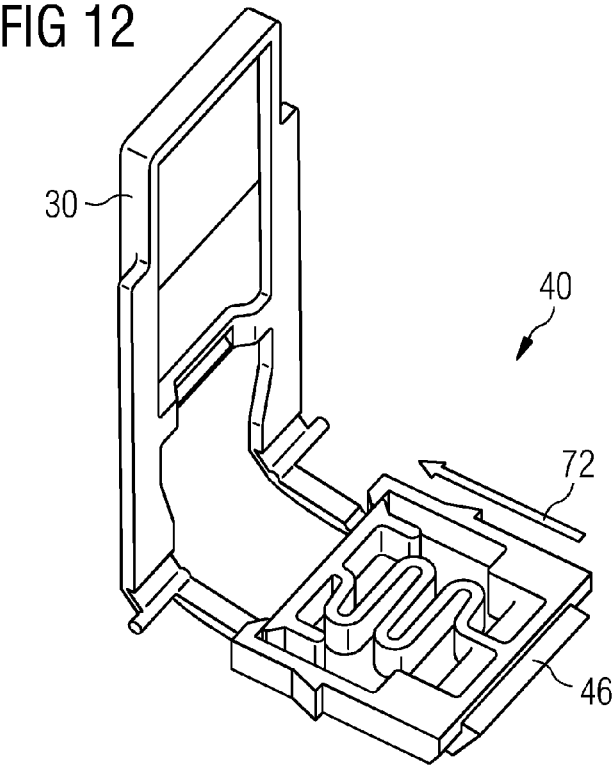
FIG. 12 is a perspective view of the slide with the cover with a tensioned slide spring.

FIGS. 11 and 12 show the slide 40 which has a one-piece cover 30 of the functional connection 20. The cover 30 is connected via a flexible slide strap 50 to the slide 40. The flexible slide strap 50 can have a film hinge. The latching contours 55 enable the slide 40 to assume different latching positions 23 on the housing 11 of the rail-mounted device 10. The one-piece slide 40 can be used in particular in a so-called low-cost rail-mounted device 10. This variant of the slide 40 cannot be retrofitted during production and the customer cannot change the terminal system—but this slide 40 still has the following advantages: cost-effective, the slide 40 can be actuated from the front without using any force, the rail-mounted device 10 is able to be released easily from the bus bar network, and the latching positions 60, 61 exist between slide 40 and housing 11 of the rail-mounted device 10.

In general an inventive slide 40, after installation during production, remains captive for the customer, since the slide 40 securely snaps into the housing 11 of a rail-mounted device 10. The slide can be inserted into the rail-mounted device 10 at the end of production—i.e. with a riveted device. The specific attachment device 45 on the slide 40 ensures in conjunction with the corresponding mating attachment device 22, especially housing contours, that the slide 40 assumes the captive position on the rail-mounted device 10, through which the customer can recognize on actuation of the slide 40 whether the latter is located securely in the captive position. In this case the flexibility of the slide strap 50 can be exploited.

The complete functional connection 20 with protection against incorrect insertion 85 can be easily removed as a package from the rail-mounted device 10 and also reinserted again in order to change the connection technology from clamping terminal to ring cable shoe terminal. The contours 86 on the protection against incorrect insertion 85 of the functional connection 20 and the receptacles 90 on the housing 11 of the rail-mounted device 10 ensure that the terminal package 20, 85 cannot be positioned incorrectly by the user. The protection against incorrect insertion 85 serves in such cases simultaneously to position the functional connection 20 in the rail-mounted device 10.

The slide 40 as an individual part can be installed independently of the terminal cover 30, for example in a riveted rail-mounted device 10. For the customer the slide 40 is captive after installation. During installation of the terminal cover 30 the cover is securely connected to the slide 40, but can be released if necessary. The terminal cover 30 is simultaneously the actuator of the slide 40 and makes it possible for the customer to actuate the slide 40 without forcing it. Latching positions 23 let the customer know in which position the slide 40 is located. The flexibility of the slide strap 50 can be exploited for the latching position 23. The releasable connection between the slide 40 and the terminal cover 30 enables the customer to swap the terminal technology 20 between clamp terminal technology and ring cable shoe.

The terminal package 20, 85 cannot be incorrectly installed by the customer—this is guaranteed by the configuration of the protection against incorrect insertion 85 in conjunction with the housing 11 of the rail-mounted device 10. An inventive rail-mounted device 10 has the now described advantages.

It provides simple installation of the slide 40 and the terminal cover 30 on the rail-mounted device 10.

There is no possibility of incorrectly fitting of the functional connection 20.

The slide 40 and the terminal system 20, 85 can be used in production even with riveted rail-mounted device 10.

The customer can swap between the clamp terminal technology and the ring cable shoe.

The actuation of the slide 40 from the front is possible without the need of any tools.

The rail-mounted device 10 is able to be released from the bus bar network.

The latching positions 23 exist between the slide 40 and the housing 11 of the rail-mounted device 10.

The above explanation of the embodiments describes the present invention in the context of examples. Individual features of the embodiments can of course be combined freely with one another, in so far as this is technically expedient, without departing from the scope of the present invention.

The invention claimed is:

1. A slide for a modular rail-mounted device embodied for use in a bus bar network, the slide being used for locking the modular rail-mounted device onto an attachment rail, the slide comprising:
    a frame having an attachment device for captive attachment of the slide to the rail-mounted device, said attachment device having two latching elements with one of said latching elements disposed on each side of the slide;
    a slide spring embodied in one piece; and
    a cover section, on said cover section a cover of the rail-mounted device is able to be disposed, and said cover section and said frame are able to be moved relative to one another against a spring force of said slide spring.

2. The slide according to claim 1, wherein said cover section has latching devices and said frame has latching receptacles, so that said cover section can latch by means of said latching devices onto said latching receptacles of said frame against the spring force of said slide spring.

3. The slide according to claim 1, wherein at least one of said latching elements is at least one latching projection.

4. A slide for a modular rail-mounted device embodied for use in a bus bar network, the slide being used for locking the modular rail-mounted device onto an attachment rail, the slide comprising:
    a frame having an attachment device for captive attachment of the slide to the rail-mounted device, said attachment device having two latching elements with one of said latching elements disposed on each side of the slide;
    a slide spring embodied monolithically with the slide; and
    a cover section, on said cover section a cover of the rail-mounted device is able to be disposed, and said cover section and said frame are able to be moved relative to one another against the spring force of said slide spring.

5. A modular rail-mounted device for use in a bus bar network, comprising:
    a functional connection for a connection of a lead and having a cover with an opening formed therein for passage of the lead;
    a slide for locking the modular rail-mounted device onto an attachment rail, wherein said slide having an attachment device for captive attachment of said slide to the rail-mounted device, said attachment device having two latching elements with one of said latching elements disposed on each side of said slide; and
    at least one mating attachment device for captive attachment of said slide to said modular rail-mounted device.

6. The modular rail-mounted device according to claim 5, wherein said mating attachment device is embodied complementary to said attachment device.

7. The modular rail-mounted device according to claim 5, wherein said mating attachment device is a latching receptacle.

8. The modular rail-mounted device according to claim 5, wherein said slide and said cover are releasably connected to one another.

9. The modular rail-mounted device according to claim 5, further comprising a flexible slide strap, said slide and said cover are connected to each other via said flexible slide strap.

10. The modular rail-mounted device according to claim 5, wherein said slide and said cover are embodied in one piece.

11. The modular rail-mounted device according to claim 5, further comprising at least one viewing window mounted onto said mating attachment device.

12. The modular rail-mounted device according to claim 5, wherein said functional connection is disposed exchangeably behind said cover.

13. The modular rail-mounted device according to claim 3, wherein said functional connection is a clamp terminal connection or a ring cable shoe connection.

14. The modular rail-mounted device according to claim 5, further comprising a housing part and said latching receptacle is a recess formed in said housing part.

15. The modular rail-mounted device according to claim 5, wherein said slide and said cover are embodied monolithically.

16. A bus bar network, comprising:
    an attachment rail;
    at least two modular rail-mounted devices each containing:
        a functional connection for a connection of a lead and having a cover with an opening formed therein for passage of the lead;
        a slide for locking said modular rail-mounted device onto said attachment rail, wherein said slide having an attachment device for captive attachment of said slide to said rail-mounted device, said attachment device having two latching elements with one of said latching elements disposed on each side of said slide;
        at least one mating attachment device for captive attachment of said slide to said modular rail-mounted device; and
    said attachment rail into or onto which said rail-mounted devices are able to be locked.

17. The bus bar network according to claim 16, wherein said attachment rail is a top-hat rail.

* * * * *